(12) United States Patent
Oba et al.

(10) Patent No.: US 8,971,239 B2
(45) Date of Patent: Mar. 3, 2015

(54) PLMN SELECTION AND INTER-SYSTEM MOBILITY POLICY CONFLICT RESOLUTION FOR MULTI-INTERFACE USER

(75) Inventors: Yoshihiro Oba, Kanagawa (JP); Raquel Morera, Morristown, NJ (US); Subir Das, Belle Mead, NJ (US)

(73) Assignees: Kabushiki Kaisha Toshiba, Tokyo (JP); Telcordia Technologies Inc., Piscataway, NJ (US)

( * ) Notice: Subject to any disclaimer, the term of this patent is extended or adjusted under 35 U.S.C. 154(b) by 694 days.

(21) Appl. No.: 12/862,259

(22) Filed: Aug. 24, 2010

(65) Prior Publication Data

US 2011/0085498 A1 Apr. 14, 2011

Related U.S. Application Data

(60) Provisional application No. 61/236,428, filed on Aug. 24, 2009.

(51) Int. Cl.
*H04W 4/00* (2009.01)
*H04W 48/18* (2009.01)
(Continued)

(52) U.S. Cl.
CPC ............ *H04W 48/18* (2013.01); *H04W 60/005* (2013.01); *H04W 88/06* (2013.01)
USPC .......................................... 370/326; 370/331

(58) Field of Classification Search
CPC .... H04W 48/18; H04W 88/06; H04W 60/005
USPC ................................................. 370/328, 331
See application file for complete search history.

(56) References Cited

U.S. PATENT DOCUMENTS

| 6,285,660 B1 * | 9/2001 | Ronen ........................... 370/259 |
| 2005/0135295 A1 * | 6/2005 | Walton et al. ................. 370/328 |
| 2007/0143851 A1 * | 6/2007 | Nicodemus et al. ............ 726/25 |

(Continued)

FOREIGN PATENT DOCUMENTS

| WO | 2005/039133 A1 | 4/2005 |
| WO | 2007/075850 A2 | 7/2007 |

OTHER PUBLICATIONS

International Search Report of PCT/US2010/046470, date of mailing Nov. 5, 2010.

(Continued)

*Primary Examiner* — Noel Beharry
*Assistant Examiner* — Farhad Ali
(74) *Attorney, Agent, or Firm* — Westerman, Hattori, Daniels & Adrian, LLP

(57) ABSTRACT

A mobile device includes: multiple interfaces that are configured to support a various access technology such as 3G or Wi-Fi etc. A public land mobile network (PLMN) selector that generates a list for each of the PLMN networks that provide coverage to the mobile device. A PLMN selection policy parameter that is set to True or False to allow or prohibit the selection of PLMN networks by the mobile device based on the generated list where the generated list includes information as to different access technologies and selection priorities supported on the PLMN access networks providing coverage to the mobile device. In particular, when the PLMN selection policy parameter is set to True, multiple PLMN registrations are allowed; and when the A PLMN selection policy parameter is set to False, multiple PLMN registrations are prohibited.

16 Claims, 9 Drawing Sheets

(51) Int. Cl.
*H04W 60/00* (2009.01)
*H04W 88/06* (2009.01)

(56) References Cited

U.S. PATENT DOCUMENTS

2008/0311855 A1 12/2008 Manousakis et al.
2009/0059814 A1* 3/2009 Nixon et al. .................. 370/254
2009/0207806 A1* 8/2009 Makela et al. ................ 370/331
2010/0261474 A1* 10/2010 Gollapudi et al. ......... 455/435.3
2010/0296415 A1* 11/2010 Sachs et al. ................... 370/254

OTHER PUBLICATIONS

Chinese Office Action dated Jul. 11, 2014, issued in Chinese Patent Application No. 201080047753.8, w/English translation (21 pages).

* cited by examiner

Example Inter-System Mobility Policies (ISMP) for Use Case 2 (T1: 3G, T2: Wi-Fi)

Policies provided by H-ANDSF (Home operator = P)

| Access ID | Access Tech. | IP Flow | Priority |
|---|---|---|---|
| P | T1 | A | 12 |
| P | T1 | B | 11 |
| P | T2 | A | 10 |
| P | T2 | B | 9 |
| P1 | T1 | A | 8 |
| P1 | T1 | B | 7 |
| P1 | T2 | A | 6 |
| P1 | T2 | B | 5 |
| P2 | T2 | A | 2 |
| P2 | T2 | B | 1 |

Policies provided by V-ANDSF1 (Visited operator = P1)

| Access ID | Access Tech. | IP Flow | Priority |
|---|---|---|---|
| P | T1 | A | 8 |
| P | T1 | B | 7 |
| P | T2 | A | 6 |
| P | T2 | B | 5 |
| P1 | T1 | A | 10 |
| P1 | T1 | B | 9 |
| P1 | T2 | A | 12 |
| P1 | T2 | B | 11 |
| P2 | T2 | A | 2 |
| P2 | T2 | B | 1 |

Policies provided by V-ANDSF2 (Visited operator = P2)

| Access ID | Access Tech. | IP Flow | Priority |
|---|---|---|---|
| P | T1 | A | 8 |
| P | T1 | B | 7 |
| P | T2 | A | 6 |
| P | T2 | B | 5 |
| P1 | T1 | A | 4 |
| P1 | T1 | B | 3 |
| P1 | T2 | A | 2 |
| P1 | T2 | B | 1 |
| P2 | T2 | A | 10 |
| P2 | T2 | B | 9 |

Assumption: IP Flow is part of ISMP

Example SCR Policies

| ANDSF | Conflict Resolution Type | Access Technology | IP Flow | Precedence |
|---|---|---|---|---|
| H-ANDSF | SCR | * | * | 3 |
| V-ANDSF1 | SCR | * | * | 2 |
| V-ANDSF2 | SCR | * | * | 1 |

- An entry marked with '*' indicates a wildcard entry that matches any value
- The conflict resolution policy table is searched from top to bottom and the entry that matches with the conflict resolution type, Access Technology and IP flow and has the highest Precedence value will be applied to a specific combination of ANDSFs, access technology and IP flow
- For SCR, Access Technology and IP Flow entries are always wildcards

FIG. 7

Example FCR Policies

| ANDSF | Conflict Resolution Type | Access Technology | IP Flow | Precedence |
|---|---|---|---|---|
| H-ANDSF | FCR | * | A | 3 |
|  |  | * | * | 1 |
| V-ANDSF1 | FCR | T1 | * | 3 |
|  |  | * | * | 1 |
| V-ANDSF2 | FCR | * | A | 1 |
|  |  | T1 | * | 2 |
|  |  | * | * | 3 |

- An entry marked with '*' indicates a wildcard entry that matches any value
- The conflict resolution policy table is searched from top to bottom and the entry that matches with the conflict resolution type, Access Technology and IP flow and has the highest Precedence value will be applied to a specific combination of ANDSFs, access technology and IP flow

FIG. 8

ISMP After Applying SCR Policies

| Access ID | Access Tech. | IP Flow | Priority |
|---|---|---|---|
| P | T1 | A | 12 |
| P | T1 | B | 11 |
| P | T2 | A | 10 |
| P | T2 | B | 9 |
| P1 | T1 | A | 8 |
| P1 | T1 | B | 7 |
| P1 | T2 | A | 6 |
| P1 | T2 | B | 5 |
| P2 | T2 | A | 2 |
| P2 | T2 | B | 1 |

Rules after conflict resolution

All policies provided by H-ANDSF are adopted

PLMN SELECTION AND INTER-SYSTEM MOBILITY POLICY CONFLICT RESOLUTION FOR MULTI-INTERFACE USER

CROSS-REFERENCE TO RELATED APPLICATION

This application claims the benefit of U.S. Provisional Application No. 61/236,428, filed Aug. 24, 2009, the entire disclosure of which is incorporated herein by reference.

BACKGROUND

1. Field

The concept relates to a multi-interface mobile device selecting multiple networks simultaneously from different access networks. In particular, the mobile device to simultaneously register in multiple networks while roaming by obtaining policies from the visited networks and also resolving inter-system policy conflicts among variety of access networks.

2. Description of Related Art

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infra-red, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media Independent Handover Services:

In I.E.E.E. P802.21/D.01.09, September 2006, entitled Draft IEEE Standard for Local and Metropolitan Area Networks: Media Independent Handover Services, among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems.

"The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc.)." See 1.1 of I.E.E.E. P802.21/D.01.09, September 2006, entitled Draft IEEE Standard for Local and Metropolitan Area Networks: Media Independent Handover Services, the entire contents of which document is incorporated herein into and as part of this patent application. In addition, the provisional application from which priority is claimed herein also incorporated Draft 05 (Referred to herein as D05) of said standard, the entire contents of which is again incorporated herein by reference—i.e., see, e.g., I.E.E.E. P802.21/D05.00, April, 2007, Draft Standard for Local and Metropolitan Area Networks: Media Independent Handover Services, Sponsored by the LAN MAN Standards Committee of the I.E.E.E. Computer Society.

Illustrative Architecture:

FIG. 1 depicts some illustrative architectural components that can be employed in some illustrative and non-limiting implementations including wireless access points to which client devices communicate. In this regard, FIG. 1 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 2 shows an illustrative computer or control unit that can be used to implement computerized process steps, to be carried out by devices, such as, e.g., an access point, a user station, a source node or destination node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

For further background reference, PART B of this application is a copy of the following documents which are incorporated herein as part of this application:
1. 3rd Generation Partnership Project; Technical Specification Group Services and System Aspects; Architecture enhancements for non-3GPP accesses (Release 9) (3GPP TS 23.402 V9.1.0 (2009-June)).
2. 3rd Generation Partnership Project; Technical Specification
Group Core Network and Terminals; Non-Access-Stratum (NAS) functions related to Mobile Station (MS) in idle mode (Release 8)(3GPP TS 23.122 V8.6.0 (2009-June)).

SUMMARY

A mobile device includes a plurality of interfaces each of which is configured with a different access technology. A network selector that generates a list for each of a plurality of access networks providing coverage to the mobile device; and, a network selection policy parameter that has at least two settings to trigger a selection of the access networks by the mobile device. The list includes at least different access technologies and selection priorities supported on the access networks providing coverage to the mobile device.

A first setting of the two settings of the network selection policy parameter allows for the selection of more than one access network from the plurality of access networks simultaneously when one access network does not provide access to each of the different access technology supported by the plurality of interfaces of the mobile device; and the selection is based upon the network selector generated list for the access networks within the coverage of the mobile device. Also, a first setting of the two settings of the network selection policy parameter allows for the selection of only one access network when the one access network provides access to each of the different access technology supported by the plurality of interfaces of the mobile device.

A second setting of the two settings of the network selection policy parameter prohibits the selection of more than one access network from the plurality of access networks simultaneously even when no one access network provides access to each of the different access technology supported by the plurality of interfaces of the mobile device. A second setting of the two settings of the network selection policy parameter allows for selecting an access network when the access network provides access to each of the different access technology supported by the plurality of interfaces of the mobile device. Also, a second setting of the two settings of the network selection policy parameter allows for selecting an access network based upon the network selector generated list when none of the access networks within the coverage of the mobile device provides access to each the different access technology supported by the plurality of interfaces of the mobile device.

The mobile device registers with each of more than one accessed networks such that each of the plurality of interfaces configured with the different access technologies are provided access on more than one accessed networks within the coverage of the mobile device. The mobile device uses at least a first gateway to act as a mobile Internet Protocol version 6 (IPv6) home agent and a second gateway to act as a proxy mobile IPv6 local mobility agent; and the first gateway provides an internet protocol (IP) flow mobility across more than one accessed networks selected by the mobile device.

The mobile device performs the IP flow mobility binding with the first gateway so that some of the internet protocol (IP) flows to go through one of the plurality of interfaces supporting a specific access technology and other of the IP flows to go through other of the plurality of interfaces supporting a different specific access technology. The mobile device obtains inter-system mobility policies from a functional unit of a home access network as well as functional units corresponding to visited access networks, in which the functional unit of the home access network and the functional units of each of the visited access networks contain data management and control functionality to provide network discovery and selection assistance data that corresponds to each of the aforesaid the access networks' policy.

The functional unit of the home access network and only one of the functional units from the visited access networks provide IP flow mobility policies across more than one accessed networks selected by the mobile device. The two settings are TRUE and FALSE.

In some exemplary embodiments a method by which a mobile device resolves inter-system mobility policy conflict among access networks providing coverage to the mobile device, including searching a table containing conflict resolution policies for the access networks providing coverage to the mobile device; choosing entries from the table that match as to at least a conflict resolution type entry, an access technology entry and an internet protocol (IP) flow entry; and applying the matched entries having a highest precedence value to a specific combination of the access networks, access technology and IP flow.

The mobile device adopts all policies from one access network when the conflict resolution type entry is a strict conflict resolution (SCR). The mobile device adopts some policies from one access network and others from other access networks when the conflict resolution type entry is a flexible conflict resolution (FCR). A tie breaking policy is adopted when two or more the matched networks have the same highest precedence. The mobile device adopts policies from a functional unit on a home access network for the SCR and does not adopt policies on a particular access technology obtained from a functional unit on a visited access network when the access technology to which the mobile device is connected to belongs to a different visited access network. The mobile device adopts policies from a function unit on a home access network for the FCR and does not adopt policies on a particular access technology obtained from a functional unit on a visited access network when the access technology to which the mobile device is connected to belongs to a different visited access network.

In some exemplary embodiments a system, having a plurality of access networks; at least a mobile device having a plurality of interfaces each of which is configured with a different access technology; a network selector to generate a list for each of the plurality of access networks providing coverage to the mobile device; and a network selection policy parameter having at least two settings to trigger a selection of the access networks by the mobile device, in which the list includes at least different access technologies and selection priorities supported on the access networks providing coverage to the mobile device.

A first setting of the two settings of the network selection policy parameter allows for the selection of more than one access network from the plurality of access networks simultaneously when one access network does not provide access to each of the different access technology supported by the plurality of interfaces of the mobile device; and the selection is based upon the network selector generated list for the access networks within the coverage of the mobile device. Also, a first setting of the two settings of the network selection policy parameter allows for the selection of only one access network when the one access network provides access to each of the different access technology supported by the plurality of interfaces of the mobile device.

A second setting of the two settings of the network selection policy parameter prohibits the selection of more than one access network from the plurality of access networks simultaneously even when no one access network provides access to each of the different access technology supported by the plurality of interfaces of the mobile device. A second setting of the two settings of the network selection policy parameter allows for selecting an access network when the access network provides access to each of the different access technology supported by the plurality of interfaces of the mobile device. Also, a second setting of the two settings of the network selection policy parameter allows for selecting an access network based upon the network selector generated list when none of the access networks within the coverage of the mobile device provides access to each the different access technology supported by the plurality of interfaces of the mobile device.

The mobile device registers with each of more than one accessed networks such that each of the plurality of interfaces configured with the different access technologies are provided access on more than one accessed networks within the coverage of the mobile device. The mobile device uses at least a first gateway to act as a mobile Internet Protocol version 6 (IPv6) home agent and a second gateway to act as a proxy mobile IPv6 local mobility agent; and the first gateway provides an internet protocol (IP) flow mobility across more than one accessed networks selected by the mobile device.

The mobile device performs the IP flow mobility binding with the first gateway so that some of the internet protocol (IP) flows to go through one of the plurality of interfaces supporting a specific access technology and other of the IP flows to go through other of the plurality of interfaces supporting a different specific access technology. The mobile device obtains inter-system mobility policies from a functional unit of a home access network as well as functional units corresponding to visited access networks, in which the functional unit of the home access network and the functional units of each of the visited access networks contain data management and control functionality to provide network discovery and selection assistance data that corresponds to each of the aforesaid the access networks' policy.

The functional unit of the home access network and only one of the functional units from the visited access networks provide IP flow mobility policies across more than one accessed networks selected by the mobile device. The two settings being a first setting and a second setting, in which the first setting is TRUE and the second setting is FALSE.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and other features and advantages of embodiments of the present invention will become more apparent by describing in detail exemplary embodiments thereof with reference to the attached drawings in which:

FIG. 5 depicts an illustrative example of inter-system mobility policies (ISMP) table for use case 2;

FIG. 6 depicts an illustrative example of strict conflict resolution (SCR) policies table;

FIG. 7 depicts an illustrative example of flexible conflict resolution (FCR) policies table;

FIG. 8 depicts an illustrative example of inter-system mobility policies after applying strict conflict resolution policies.

DETAILED DESCRIPTION

Figure 1:
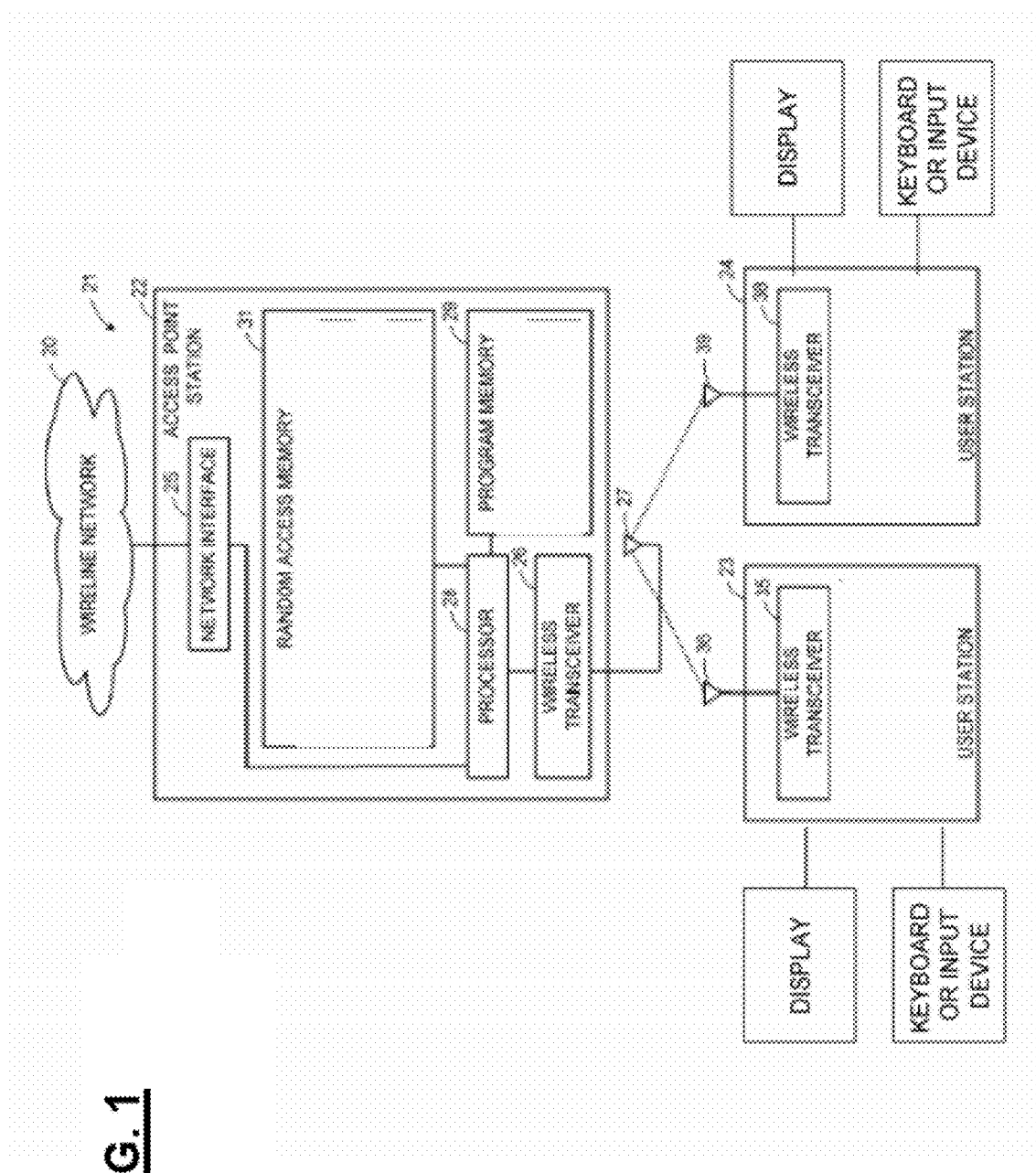
FIG. 1 depicts some illustrative architectural components that can be employed in some illustrative and non-limiting implementations including wireless access points to which client devices communicate.
Figure 2:
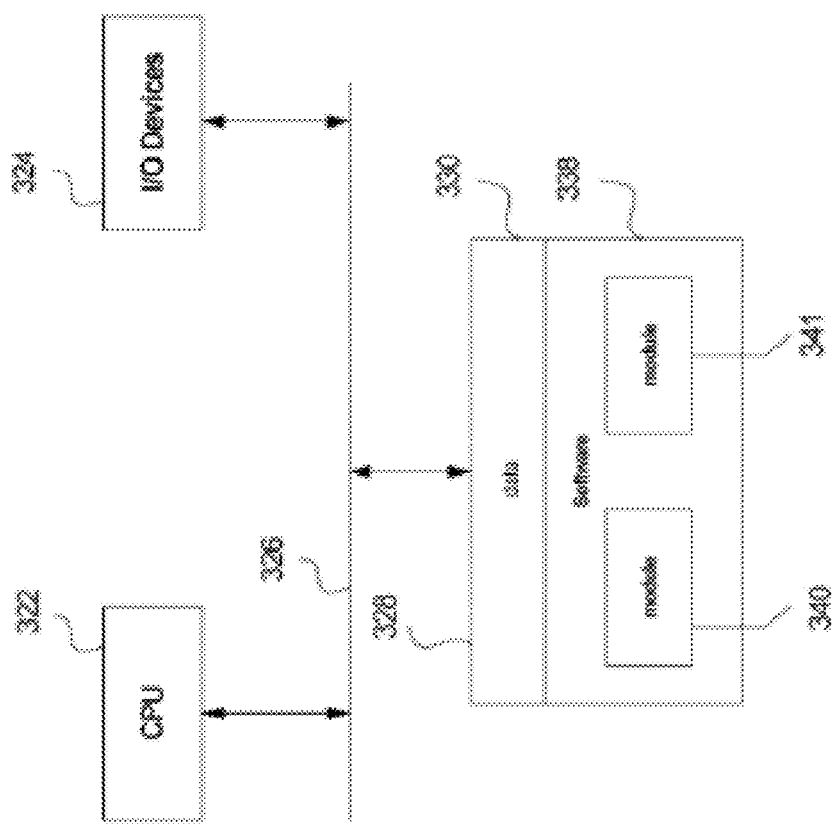
FIG. 2 shows an illustrative computer or control unit that can be used to implement computerized process steps, to be carried out by devices, such as, e.g., an access point, a user station, a source node or destination node in some embodiments.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Definition

This section sets forth some definitions that are applicable to some preferred embodiments of the present invention.

ANDSF (Access Network Discovery and Selection Function): A function that contains data management and control functionality necessary to provide network discovery and selection assistance data as per operators' policy.

PLMN (Public Land Mobile Network): A network that is established and operated by an administration or by a recognized operating agency (ROA) for the specific purpose of providing land mobile telecommunications services to the public.

HPLMN (Home PLMN): The PLMN the subscriber belongs to.

RPLMN (Registered PLMN): This is the PLMN on which the UE has performed a location registration successfully.

EHPLMN: The equivalent PLMN that is stored in USIM.

VPLMN (Visited PLMN): The PLMN the subscriber is roaming in.

H-ANDSF: ANDSF in HPLMN (or RPLMN or EHPLMN).

V-ANDSF: ANDSF in VPLMN.

UE (User Equipment): A terminal (e.g., a mobile device) used by the subscriber to connect to a PLMN.

PDN (Packet Data Network) connection: A connection between UE and P-GW (PDN Gateway) in a PLMN for carrying application traffic:

IP Flow Mobility: A functionality that allows UE with multiple interfaces to simultaneously connect to multiple access networks and dynamically route to specific access networks individual flows generated by the same or different applications belonging to the same PDN connection.

Problem Description

This section sets forth a description of the problems addressed by the preferred embodiments of the present invention described below.

Public Land Mobile Network (PLMN) selection:

Current PLMN selection described in 3GPP TS 23.122 is made based on PLMN selector consisting of a list of (PLMN, access technology, priority);

e.g., ((PLMN1,T1,3),(PLMN1,T2,3),(PLMN2,T1,2),(PLMN2,T2,2)).

However, currently PLMN selection does not take into account the scenario where User Equipments (UEs) can select multiple PLMNs simultaneously through different access networks.

Multiple simultaneous PLMN registrations:

Currently TS 23.122 does not define procedures for user equipment (UE) to perform simultaneous registrations with multiple PLMNs.

In other words, if a UE were to simultaneously be connected to a 3GPP network and a non-3GPP network each belonging to a different operator, the current specifications do not support for such multiple simultaneous PLMN registrations.

Currently in TS 23.402, when the UE is roaming, the UE can obtain policies from the visitor access network discovery and selection function (V-ANDSF) that is available in the visited PLMN (V-PLMN).

However, the present inventors have found that, as described below, if the UE were to be simultaneously registered in multiple PLMNs while roaming, it is possible for the UE to obtain policies from two different V-ANDSFs. Policy conflicts between V-ANDSFs would then need to be resolved.

PLMN Selection According to Preferred Embodiments

This section sets forth PLMN Selection mechanisms according to some preferred embodiments, and, in particular, PLMN Selection considering multiple simultaneous PLMN registrations. In the preferred embodiments, the following mechanism is carried out:

Define a new PLMN selection policy parameter 'MultipleSimultaneousPLMNRegistrationAllowed' of type boolean.

If this parameter is set to TRUE, multiple PLMN registrations are allowed.

Only one PLMN is selected for both 3GPP and non-3GPP networks if such a PLMN is available at the current location of UE and can provide access to both 3GPP and non-3GPP networks. Otherwise, multiple PLMNs are selected for 3GPP and non-3GPP networks simultaneously depending upon PLMN selector.

For example, if PLMN selector is ((PLMN1,T1,3),(PLMN1,T2,3),(PLMN2,T1,2),(PLMN2,T2,2)):

If PLMN1's access technology T1 and PLMN2's access technologies T1 and T2 are available but PLMN1's access technology T2 is not available at the current location of UE, then PLMN2 will be selected for both access technologies T1 and T2;

If PLMN1's access technology T1 and PLMN2's access technology T2 are available but PLMN1's access technology T2 is not available at the current location of UE, then PLMN1 will be selected for T1 and PLMN2 will be selected for T2.

If this parameter is set to FALSE, multiple PLMN registrations are prohibited.

Only one PLMN is selected for both 3GPP and non-3GPP networks if such a PLMN is available at the current location of UE and can provide access to both 3GPP and non-3GPP networks. Otherwise, UE selects either one PLMN for 3GPP networks or the other PLMN for non-3GPP networks depending on PLMN selector.

For example, if PLMN selector is ((PLMN1,T1,3),(PLMN1,T2,3),(PLMN2,T1,2),(PLMN2,T2,2)):

If PLMN1's access technology T1 and PLMN2's access technologies T1 and T2 are available but PLMN1's access technology T2 is not available at the current location of UE, then PLMN2 will be selected for both access technologies T1 and T2;

If PLMN1's access technology T1 and PLMN2's access technology T2 are available but PLMN1's access technology T2 is not available at the current location of UE, then PLMN1 will be selected for T1 and no PLMN will be selected for T2.

Illustrative Use Case 1

Figure 3:
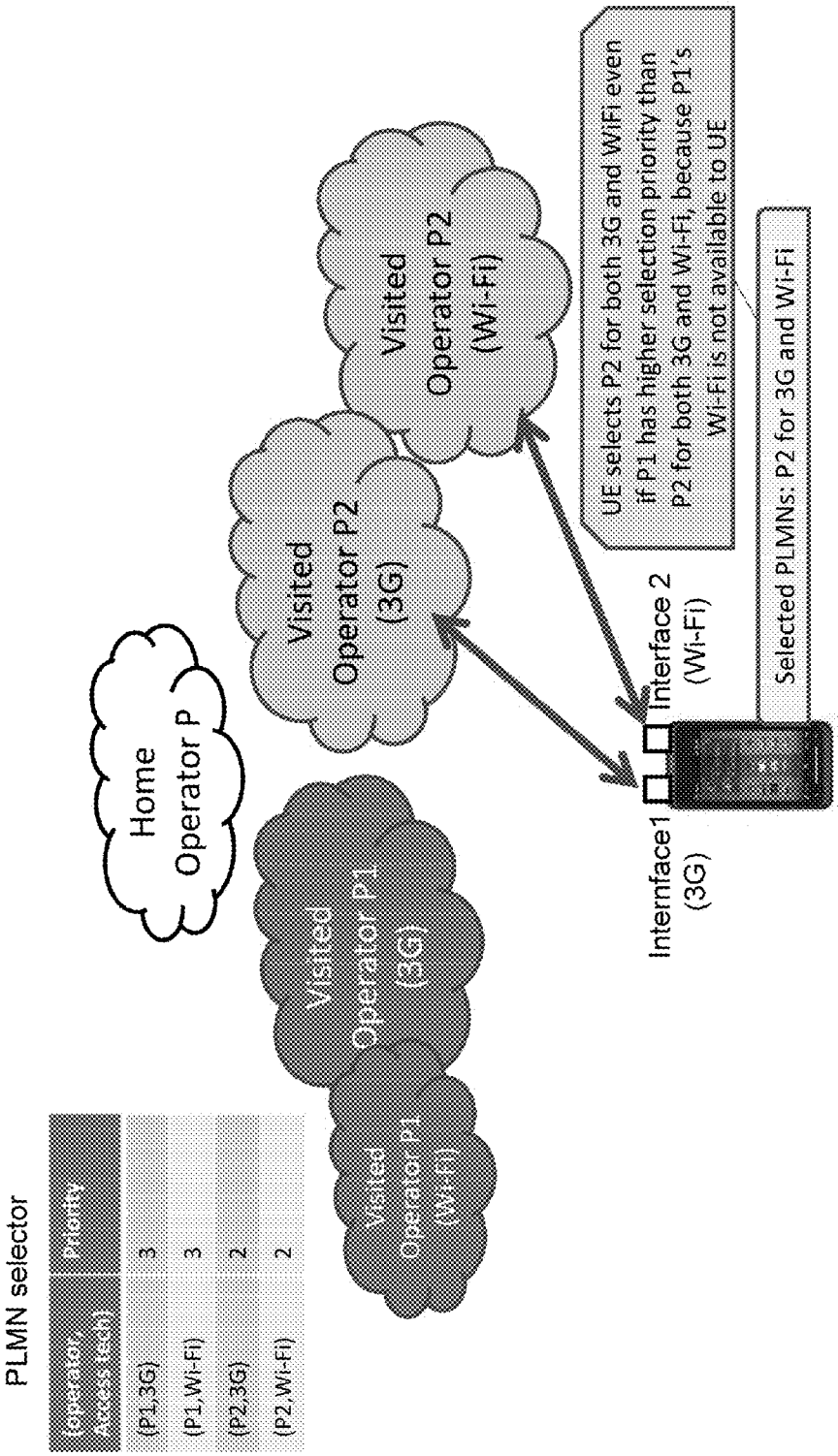
FIG. 3 illustrates a multi-interface user equipment accessing network(s) that include home and visited networks for use case 1 described below.

Now, referring to FIG. 3, an illustrative Use Case 1 is shown. In this example, the UE is shown as out of coverage of P1's Wi-Fi, and MultipleSimultaneousPLMNRegistrationAllowed is set to TRUE or FALSE. In this illustrative example, a device has an Interface 1 (3G) and an Interface 2 (Wi-Fi). Here, the drawing shows an illustrative example with a visited operator P1 (Wi-Fi), a visited operator P1 (3G), a home operator (P), a visited operator P2 (3G), and a visited operator P2 (Wi-Fi). Here, the UE is shown selecting P2 for both 3G and Wi-Fi even if P1 has a higher selection priority than P2 for both 3G and Wi-Fi because P1's Wi-Fi is not available to UE.

Use Case 2 (Multiple Simultaneous PLMN Registrations)

Figure 4:
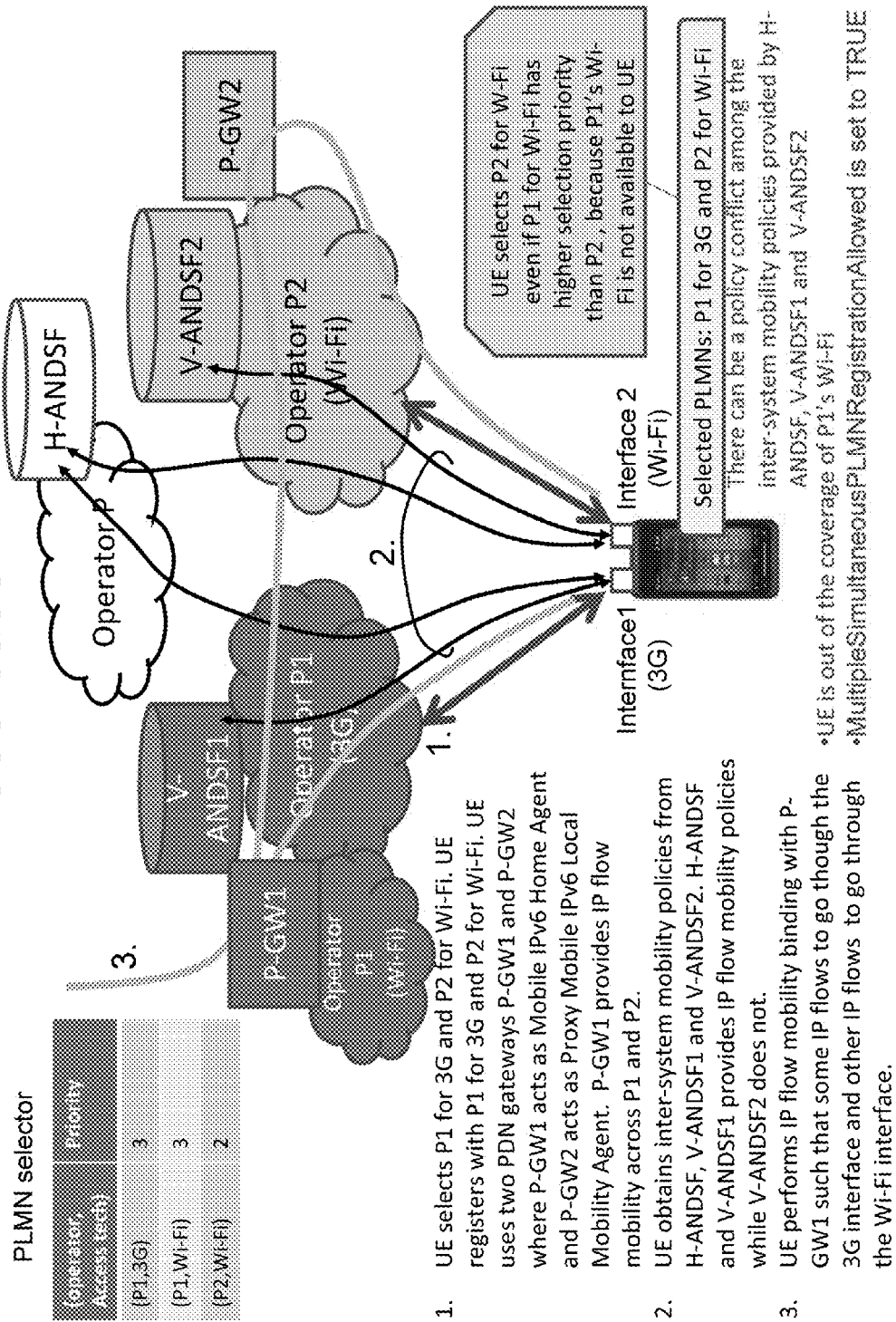
FIG. 4 illustrates a multi-interface user equipment accessing network(s) that include home and visited networks for use case 2 described below.

Now, referring to FIG. 4 (which has a device with Interfaces 1 and 2 similar to that shown in FIG. 3), an illustrative Use Case 2 depicting multiple simultaneous PLMN registrations is shown. In this example, the UE is shown as out of coverage of P1's Wi-Fi, and MultipleSimultaneousPLMNRegistrationAllowed is set to TRUE.

In this illustrative example the following steps are performed:
1. The UE selects P1 for 3G and P2 for Wi-Fi. The UE registers with P1 for 3G and P2 for Wi-Fi. UE uses two PDN gateways P-GW1 and P-GW2 where P-GW1 acts as Mobile IPv6 Home Agent and P-GW2 acts as Proxy Mobile IPv6 Local Mobility Agent. P-GW1 provides IP flow mobility across P1 and P2.
2. The UE obtains inter-system mobility policies from H-ANDSF, V-ANDSF1 and V-ANDSF2. H-ANDSF and V-ANDSF1 provides IP flow mobility policies while V-ANDSF2 does not.
3. The UE performs IP flow mobility binding with P-GW1 such that some IP flows to go though the 3G interface and other IP flows to go through the Wi-Fi interface.

As shown, in this example, the UE selects P2 for Wi-Fi even if P1 for Wi-Fi has higher selection priority than P2 because P1's Wi-Fi is not available to UE.

As also shown in FIG. 4, there can be a policy conflict among the inter-system mobility policies provided by H-ANDSF, V-ANDSF1 and V-ANDSF2.

Inter-System Mobility Policy Conflict Resolution Solution

In some preferred embodiments, inter-system mobility policy conflict resolution can be addressed by carrying out the following method.

UE has the responsibility to resolve policy conflicts among ANDSF's:
    Including conflicts between H-ANDSF and V-ANDSF and conflicts between V-ANDSF's.
Introduction of two types of conflict resolution:
    Strict Conflict Resolution (SCR):
        UE adopts all policies from one ANDSF.
    Flexible Conflict Resolution (FCR):
        UE adopts some policies from one ANDSF and others from other ANDSF's. For example:
            Use H_ANDSF's policies for specific access technologies;
            Use V_ANDSF1's policies for IP flow A;
            Use V_ANDSF2's policies for other IP flows.

FCR policies may be defined based on "Preference" assigned to each PLMN for any combinations of conflict resolution policy components such as access technology type and IP flow type. For a given combination of conflict resolution policy components, the inter-system mobility policy from the PLMN that has the highest preference will be adopted.
    In case where two or more PLMNs have the highest preference, tie breaking policies are applied to choose one PLMN from which the inter-system mobility policy is adopted for a given combination of conflict resolution policy components.
    An example tie breaking policy: choose the first matched PLMN.
In both SCR and FCR, policies on a particular access technology obtained from V-ANDSF of a VPLMN are not adopted if the access technology to which the UE is connected to belongs to a different VPLMN.
    In this case, policies from H-ANDSF are adopted instead.
UE can chose to use one conflict resolution type per combination of ANDSF's.
Conflict resolution policies can be defined per combination of ANDSF's.
Conflict resolution policies can be configured to the UE by the user or provisioned to the UE by the home operator, including tie breaking policies.

Example Inter-System Mobility Policies (ISMP) for Use Case 2

Now, referring to FIG. 5, an illustrative example of inter-system mobility policies (ISMP) for Use Case 2 (T1: 3G, and T2: Wi-Fi) is depicted. In this example, policies provided by H-ANDSF (Home operator=P) are shown in at the left section, policies provided by V-ANDSF1 (visited operator=P1 is shown at the middle section, and policies provided by V-ANDSF1 (visited operator=P2 is shown at the right section of the diagram.

Example SCR Policies

Now, referring to FIG. 6, an illustrative example of SCR policies is depicted. In this example, an entry marked with '*' indicates a wildcard entry that matches any value. In this example, the conflict resolution policy table is searched from top to bottom and the entry that matches with the conflict resolution type, Access Technology and IP flow and has the highest Precedence value will be applied to a specific combination of ANDSFs, access technology and IP flow. In addition, in this example, for SCR, Access Technology and IP Flow entries are always wildcards.

Example FCR Policies

Now, referring to FIG. 7, an illustrative example of FCR policies is depicted. In this example, an entry marked with '*' indicates a wildcard entry that matches any value. In this example, the conflict resolution policy table is searched from top to bottom and the entry that matches with the conflict resolution type, Access Technology and IP flow and has the highest Precedence value will be applied to a specific combination of ANDSFs, access technology and IP flow.

ISMP After Applying SCR Policies

Now, referring to FIG. 8, an illustrative example of ISMP after applying SCR policies is depicted. In this example, policies after conflict resolution are shown. In this example, all policies provided by H-ANDSF are adopted. In this example, policies after conflict resolution are shown.

ISMP After Applying FCR Policies

Figure 9:
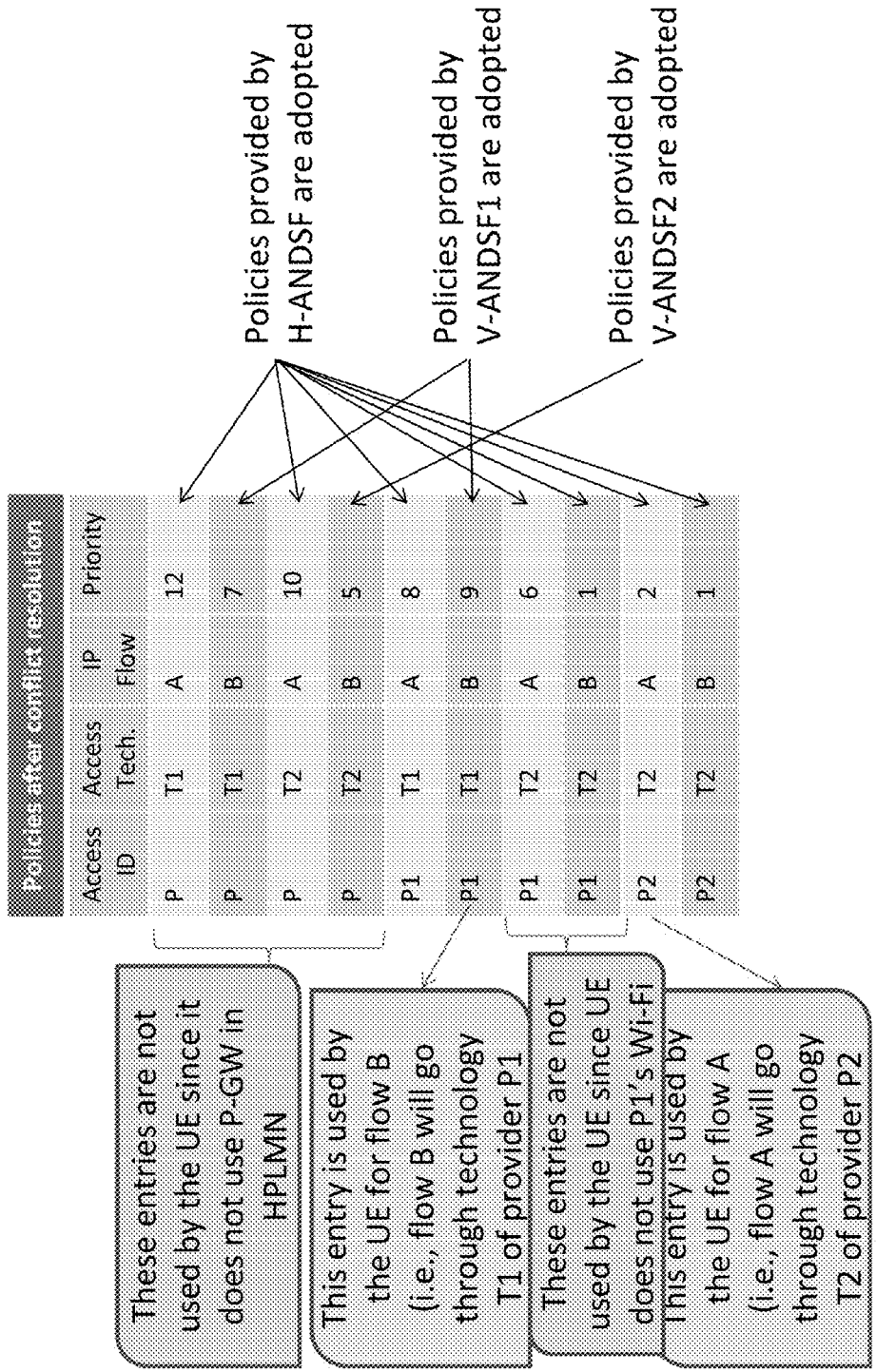
FIG. 9 depicts an illustrative example of inter-system mobility policies after applying flexible conflict resolution policies.

Now, referring to FIG. 9, an illustrative example of ISMP after applying FCR policies is depicted.

In this example, as shown at the left side of the figure, for the top four entries, these entries are not used by the UE since it does not use P-GW in HPLMN. And, for the $5^{th}$ entry, this entry is used by the UE for flow A (i.e., flow A will go through technology T1 of provider P1). And, for the $7^{th}$-$10^{th}$ entries, these entries are not used by the UE since UE does not use P1's Wi-Fi and P2's 3G. And, for the $12^{th}$ entry, this entry is used by the UE for flow B (i.e., flow B will go through technology T2 of provider P2. In this example, policies provided by H-ANDSF adopted, policies provided by V-ANDSF1 adopted, and policies provided by V-ANDSF2 adopted are shown at the right side of the figure.

Broad Scope of the Invention

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A mobile device, comprising:
a plurality of interfaces each of which is configured with a different access technology;
a network selector to generate a list for each of a plurality of access networks belonging to different visited operators associated with two or more visited public land mobile network (VPLMN) that provide coverage to the mobile device while the mobile device is roaming;
a network selection policy parameter having at least two settings to trigger a selection of the access networks belonging to the visited operators by the mobile device; and
a first setting of the two settings allowing the selection of the access networks belonging to said two or more VPLMN simultaneously when no one VPLMN, among said two or more VPLMN, provides the access networks to support access to each of said different access technology supported by said plurality of interfaces of said mobile device, said selection is based upon the network selector generated list for the access networks belonging to VPLMNs within the coverage of the mobile device,
wherein said list includes at least different access technologies and selection priorities supported on the access networks of the different visited network that provide coverage to the mobile device while the mobile device is roaming,
wherein said mobile device registers with each of said two or more VPLMN such that each of said plurality of interfaces configured with said different access technologies are provided access on said access networks on two or more VPLMN within the coverage of the mobile device,
wherein said mobile device uses at least a first gateway to act as a mobile Internet Protocol version 6 (IPv6) home agent and a second gateway to act as a proxy mobile IPv6 local mobility agent,
wherein said first gateway provides an internet protocol (IP) flow mobility across said more than one access networks selected by the mobile device, and
wherein said mobile device obtains inter-system mobility policies from a functional unit of a home access network as well as functional units corresponding to visited access networks, in which said functional unit of the home access network and said functional units of each of the visited access networks contain data management and control functionality to provide network discovery and selection assistance data that corresponds to each of the aforesaid access networks' policy.

2. The mobile device as set forth in claim 1, wherein:
the first setting of the two settings allowing the selection of the access networks belonging to only one VPLMN when the access networks of said one VPLMN provides access to each said different access technology supported by said plurality of interfaces of said mobile device.

3. The mobile device as set forth in claim 1, wherein:
a second setting of the two settings of the network selection policy parameter prohibits the selection of the access networks belonging to more than one VPLMN simultaneously even when the access networks of no one VPLMN provide access to each of said different access technology supported by said plurality of interfaces of said mobile device.

4. The mobile device as set forth in claim 1, wherein:
a second setting of the two settings of the network selection policy parameter allows for selection of the access networks of one of the two or more VPLMNs when the access networks on said one VPLMN provide access to each of said different access technology supported by said plurality of interfaces of said mobile device.

5. The mobile device as set forth in claim 1, wherein:
a second setting of the two settings of the network selection policy parameter allows for selecting a VPLMN based upon the network selector generated list when none of the two or more VPLMN within the coverage of the mobile device provides access to each said different access technology supported by said plurality of interfaces of said mobile device.

6. The mobile device as set forth in claim 1, wherein:
said mobile device performs said IP flow mobility binding with said first gateway so that some of the internet protocol (IP) flows to go through one of the plurality of interfaces supporting a specific access technology and other of the IP flows to go through other of the plurality of interfaces supporting a different specific access technology.

7. The mobile device as set forth in claim 1, wherein:
said functional unit of the home access network and only one of said functional units from the visited access networks provide IP flow mobility policies across said more than one access networks selected by the mobile device.

8. The mobile device as set forth in claim 1, wherein:
said at least two settings being a first setting and a second setting, in which said first setting being TRUE and said second setting being FALSE.

9. A system, comprising:
a plurality of access networks including access networks belonging to different visited operators;
at least a mobile device having a plurality of interfaces each of which is configured with a different access technology;
a network selector to generate a list for each of said access networks belonging to the different visited operators associated with two or more visited public land mobile network (VPLMN) that provide coverage to the mobile device while the mobile device is roaming;
a network selection policy parameter having at least two settings to trigger a selection of the access networks belonging to the visited operators by the mobile device; and
a first setting of the two settings allowing the selection of the access networks belonging to said two or more VPLMN simultaneously when no one VPLMN, among said two or more VPLMN, provides the access networks to support access to each of said different access technology supported by said plurality of interfaces of said mobile device, said selection is based upon the network selector generated list for the access networks belonging to VPLMNs within the coverage of the mobile device,
wherein said list includes at least different access technologies and selection priorities supported on the access networks of the different visited network that provide coverage to the mobile device while the mobile device is roaming,
wherein said mobile device registers with each of said two or more VPLMN such that each of said plurality of interfaces configured with said different access technologies are provided access on said access networks on two or more VPLMN within the coverage of the mobile device,
wherein said mobile device uses at least a first gateway to act as a mobile Internet Protocol version 6 (IPv6) home agent and a second gateway to act as a proxy mobile IPv6 local mobility agent,
wherein said first gateway provides an internet protocol (IP) flow mobility across said more than one access networks selected by the mobile device, and
wherein said mobile device obtains inter-system mobility policies from a functional unit of a home access network as well as functional units corresponding to visited access networks, in which said functional unit of the home access network and said functional units of each of the visited access networks contain data management and control functionality to provide network discovery and selection assistance data that corresponds to each of the aforesaid access networks' policy.

10. The system as set forth in claim 9, wherein:
the first setting of the two settings allowing the selection of the access networks belonging to only one VPLMN when the access networks of said one VPLMN provides access to each said different access technology supported by said plurality of interfaces of said mobile device.

11. The system as set forth in claim 9, wherein:
a second setting of the two settings of the network selection policy parameter prohibits the selection of the access networks belonging to more than one VPLMN simultaneously even when the access networks of no one VPLMN provide access to each of said different access technology supported by said plurality of interfaces of said mobile device.

12. The system as set forth in claim 9, wherein:
a second setting of the two settings of the network selection policy parameter allows for selection of the access networks of one of the two or more VPLMNs when the access networks on said one VPLMN provide access to each of said different access technology supported by said plurality of interfaces of said mobile device.

13. The system as set forth in claim 9, wherein:
a second setting of the two settings of the network selection policy parameter allows for selecting a VPLMN based upon the network selector generated list when none of the two or more VPLMN within the coverage of the mobile device provides access to each said different access technology supported by said plurality of interfaces of said mobile device.

14. The system as set forth in claim 9, wherein:
said mobile device performs said IP flow mobility binding with said first gateway so that some of the internet protocol (IP) flows to go through one of the plurality of interfaces supporting a specific access technology and other of the IP flows to go through other of the plurality of interfaces supporting a different specific access technology.

15. The system as set forth in claim 9, wherein:
said functional unit of the home access network and only one of said functional units from the visited access networks provide IP flow mobility policies across said more than one access networks selected by the mobile device.

16. The mobile device as set forth in claim 9, wherein:
said at least two settings being a first setting and a second setting, in which said first setting being TRUE and said second setting being FALSE.

* * * * *